3,247,186
CERTAIN 2-LOWER ALKOXY-5-PHENYL-3H-1,4-BENZODIAZEPINE 4-OXIDE COMPOUNDS AND THEIR PREPARATION
Earl Reeder, Nutley, and Leo Henryk Sternbach, Upper Montclair, N.J., assignors to Hoffmann-La Roche Inc., Nutley, N.J., a corporation of New Jersey
No Drawing. Filed Oct. 25, 1963, Ser. No. 318,783
6 Claims. (Cl. 260—239)

This application relates to novel pharmaceutically useful heterocyclic compounds and methods of preparing them. More particularly, the novel heterocyclic compounds of this invention are of the formula

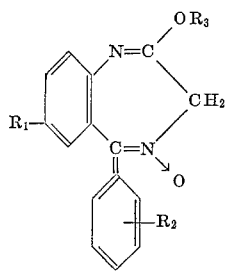

(I)

wherein $R_1$ and $R_2$ are each selected from the group consisting of hydrogen, halogen, trifluoromethyl and lower alkyl and $R_3$ is lower alkyl.

Preferred, are compounds of Formula I wherein $R_1$ is halogen or trifluoromethyl. Also preferred are compounds of Formula I wherein $R_2$ is hydrogen or is a halogen substituent in the ortho-position.

As used in this description, the term halogen includes all four halogens, i.e. fluorine, iodine, bromine and chlorine. Preferred are chlorine, fluorine and bromine. The term lower alkyl includes saturated straight and branched chain hydrocarbon moieties, for example, methyl, ethyl, propyl, isopropyl and the like.

The compounds of Formula I above can be prepared by treating a compound of the formula

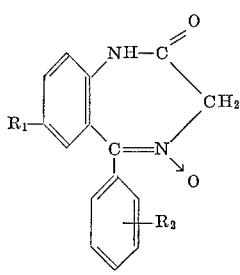

(II)

wherein $R_1$ and $R_2$ have the same meaning as above with a diazoalkane of the formula

(III)

wherein $R_4$ is lower alkylene, i.e. a moiety of the formula

wherein each $R_5$ is hydrogen or lower alkyl. Thus, by lower alkylene is mean a hydrocarbon branched or straight chain moiety having two free valences. The lower alkylene moiety identified by $R_4$ in Formula III will, of course, eventuate in and correspond to, the lower alkyl moiety represented by $R_3$ in Formula I.

The above described treatment with a diazoalkane is preferably conducted at room temperature or below. Suitably, it is conducted at a temperature below about 35° C. Advantageously, the reaction is conducted in an organic solvent, for example, a lower alkanol, or ethers such as lower alkyl ethers, diglyme and the like.

The compounds of Formula I are useful as muscle relaxants and central nervous system depressants. They can be administered internally, for example, orally or parenterally, in conventional pharmaceutical dosage forms, such as solid forms, for example, tablets, dragees, capsules or the like and liquid forms, such as suspensions, emulsions, solutions or the like. They can be combined with pharmaceutical excipients or carriers and can be submitted to conventional pharmaceutical expedients, for example, sterilization.

The compounds of Formula I above are also useful as chemical intermediates. Thus, for example, via reaction with methylamine, they can be converted into 2-methylamino-5-phenyl-1,4-3H-benzodiazepine-4-oxides which are known compounds of pharmaceutical utility. This conversion is not a part of this invention but is mentioned herein only in the interest of comprehensiveness.

The following example is illustrative but not limitative of the invention. All temperatures are stated in ° C.

*Example*

To a stirred suspension of 10 g. of 7-chloro-1,3-dihydro-5-phenyl-2H-1,4-benzodiazepin-2-one 4-oxide in ca. 150 cc. of methanol was added in portions an excess of a solution of diazomethane in ether. After almost complete solution had occurred (ca. 1 hour) the reaction mixture was filtered by gravity. The filtrate was concentrated in vacuo to a small volume, diluted with ether and petroleum ether and the precipitate formed was removed by filtration. The filtrate yielded, after concentration in vacuo, a crude reaction product. This was racrystallized several times from acetone and gave colorless rhombic plates of 7-chloro-2-methoxy-5-phenyl-3H-1,4-benzodiazepine 4-oxide melting at 191–192°.

We claim:
1. A compound selected from the group consisting of compounds of the formula

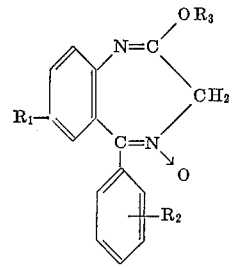

wherein $R_1$ and $R_2$ are each selected from the group consisting of hydrogen, halogen, trifluoromethyl and lower alkyl; and $R_3$ is lower alkyl.

2. 7-halo-2 - lower alkoxy - 5-phenyl-3H-1,4 - benzodiazepine 4-oxide.

3. 7-chloro-2-methoxy-5-phenyl-3H-1,4-benzodiazepine 4-oxide.

4. A method for the preparation of a compound of claim 1 which comprises treating a compound of the formula

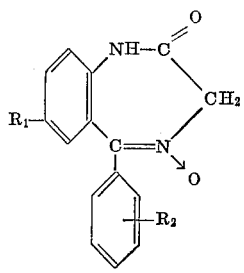

wherein $R_1$ and $R_2$ have the same meaning as in claim 1, with a diazoalkane of the formula

wherein $R_4$ is lower alkylene.

5. A process as in claim 4 wherein the diazoalkane is diazomethane.

6. A process for the preparation of the compound of claim 3 which comprises treating 7-chloro-1,3-dihydro-5-phenyl-2H-1,4-benzodiazepin-2-one 4-oxide with diazomethane.

No references cited.

NICHOLAS S. RIZZO, *Primary Examiner.*